United States Patent
Chung

[11] Patent Number: 5,974,332
[45] Date of Patent: Oct. 26, 1999

[54] BUILT-IN HANDFREE AND BATTERY CHARGING COMMUNICATION SYSTEM FOR A VEHICLE

[75] Inventor: In Hyun Chung, Songpa-Ku, Rep. of Korea

[73] Assignees: Jee Won Industrial Co., Ltd.; Byung Soo Park, both of Rep. of Korea; part interest to each

[21] Appl. No.: 08/733,570

[22] Filed: Oct. 18, 1996

[30] Foreign Application Priority Data

Jul. 19, 1996 [KR] Rep. of Korea ............... 96-29084

[51] Int. Cl.⁶ ..................................... H04B 1/38
[52] U.S. Cl. ................. 455/569; 455/90; 379/455
[58] Field of Search .................. 455/575, 573, 455/550, 568, 569, 574, 90; 379/426, 428, 430, 433, 440, 453, 454, 455

[56] References Cited

U.S. PATENT DOCUMENTS

| | | | |
|---|---|---|---|
| 5,556,017 | 9/1996 | Troy | 455/90 |
| 5,568,537 | 10/1996 | Shechet | 455/90 |
| 5,659,594 | 8/1997 | Toda | 455/575 |
| 5,659,887 | 8/1997 | Ooe | 455/575 |

Primary Examiner—Thanh Cong Le

[57] ABSTRACT

A built-in handfree and battery charging system for a vehicle having a speaker, a power source, an antenna and a phone, includes at least one handfree device having a first plate built-in in a body of the vehicle and a second plate being movable into and out of the body for charging the phone, and at least one microphone disposed inside the vehicle for use with the phone.

39 Claims, 10 Drawing Sheets

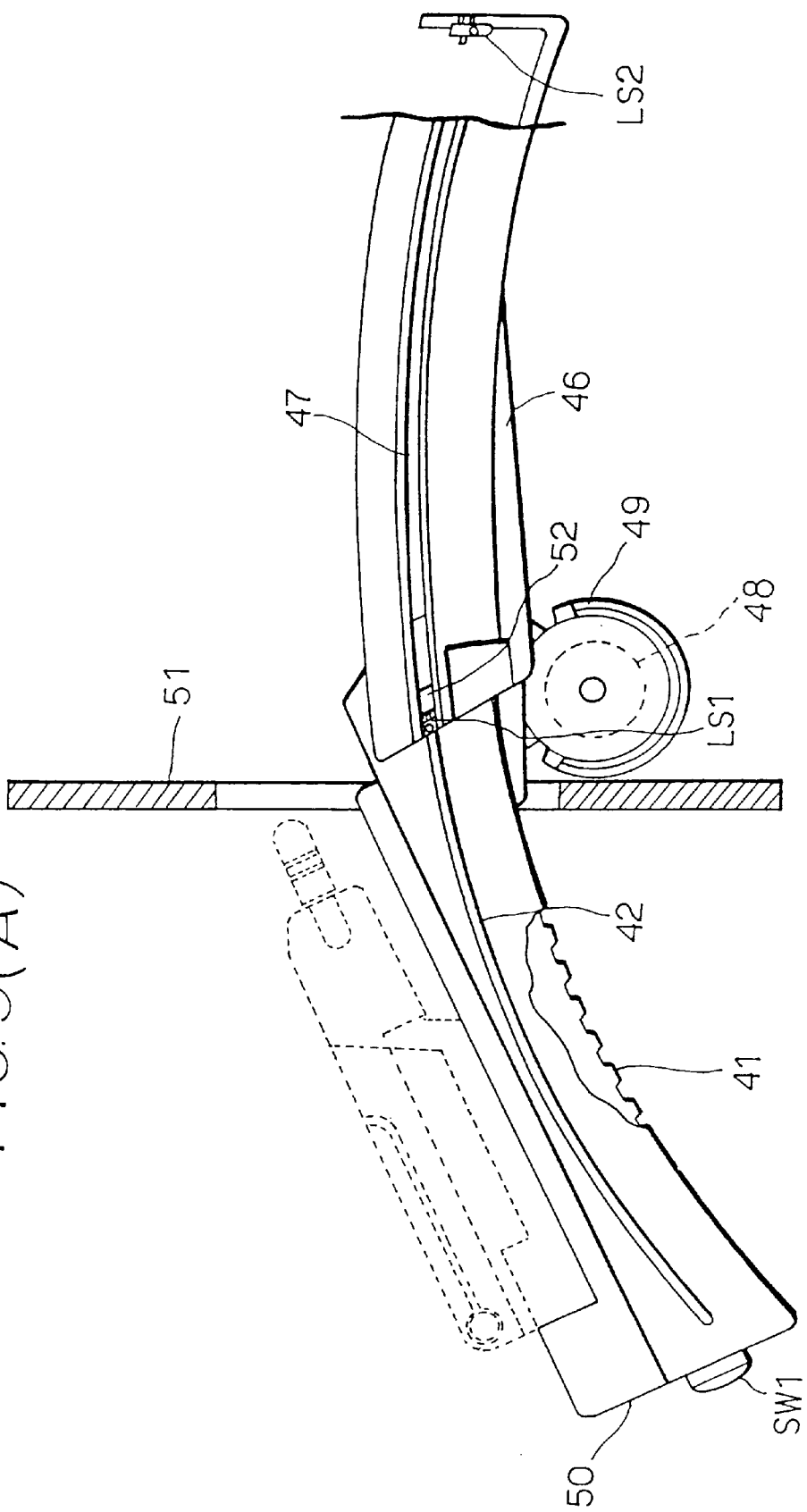

| INPUT | | | IC STATE | | | | OUTPUT | | | |
|---|---|---|---|---|---|---|---|---|---|---|
| LS1 | SW1 | LS2 | P1 CK1 | P2 CLR1 | P5 CK2 | P6 CLR2 | P12 Q1 | P9 Q2 | NODE c | NODE d |
| H | H | L | H | H | L | L | L | L | L | L |
| H | ⊓ (SW1 PUSHING MOMENT) | L | ⊔ | H | L | L | ⊔ MOTOR DRIVING STARTS AND OUTWARD MOVEMENT OF UPPER PLATE STARTS | L | ⊓ | L |
| H | L (SW1 BEING PUSHED) | L | L | H | L | L | H OUTWARD MOVEMENT OF UPPER PLATE CONTINUES | L | L | L |
| H | ⊔ (SW1 RELEASING) | L | ⊔ | H | ⊓ | L | H OUTWARD MOVEMENT OF UPPER PLATE CONTINUES | L | ⊓ | L |
| ⊓ | H | L | H | H | H | L | ⊔ MOTOR STOPS | L | ⊔ | L |
| L | H | L | H | H | H | L | L MOTOR STOPS | L | L | L |
| ⊔ | H | L | H | ⊓ | ⊔ | H | L | ⊔ MOTOR DRIVING STARTS AND INWARD MOVEMENT OF UPPER PLATE STARTS | L | ⊓ |
| H | H | L | H | H | L | H | L INWARD MOVEMENT OF UPPER PLATE CONTINUES | H | L | ⊓ |
| H | H | ⊓ | H | H | L | ⊔ | L MOTOR STOPS | ⊔ | L | H |
| H | H | ⊔ | H | H | L | L | L | L | L | ⊔ |

⊓ ⊔ : STATE CHANGING MOMENT   L H : STEADY STATE

FIG. 7

BUILT-IN HANDFREE AND BATTERY CHARGING COMMUNICATION SYSTEM FOR A VEHICLE

BACKGROUND OF THE INVENTION

1. Field of the Invention

The present invention relates to a portable communication system disposed in the interior of a vehicle, which includes a handfree device for operating a handphone while driving, and more particularly, to a built-in handcarry and battery charging communication system for a vehicle, which includes a plurality of handfree devices disposed within the interior frame of the vehicle so that a handphone is readily accessible to the user in any place inside the vehicle.

2. Description of the Related Art

Generally, earphones or handphones used while driving do not offer handfree capability, i.e., capability to operate the phone without holding the phone. Therefore, operation of such handphones while driving distracts the driver's attention, which may cause accidents and/or lack of use due to the fear of accidents.

More recently, there has been a handfree device for providing a handfree communication inside a vehicle. Such a handfree device includes a speaker, a microphone, and an antenna disposed near the driver's seat in the vehicle so as to ensure safe driving. However, the conventional handfree devices are externally and separately connected to the vehicle, and are not built-in within the interior of the vehicle. Therefore, when there is an accident and the vehicle turns or rotates, the conventional handfree devices can cause injury to the driver and passengers because they can move around inside the vehicle, violently.

Furthermore, the conventional handfree devices are usually designed and installed for the driver alone and thus, the passengers in the back seats cannot operate the conventional handfree devices. Therefore, the conventional handfree communication system is inaccessible and limited in use and application.

SUMMARY OF THE INVENTION

An object of the present invention is to provide a built-in handfree and battery charging personal communication system for a vehicle, which is disposed in such a way as to be fully concealable and installable when the vehicle is delivered from a manufacturing factory.

Another object of the present invention is to provide a built-in handcarry and battery charging communication system for a vehicle, including a plurality of handfree devices disposed at the preferred locations within the vehicle so that any person inside the vehicle has an easy and immediate access to the phone.

Another object of the present invention is to provide a built-in handfree and battery charging communication system for a vehicle, including a microphone disposed on the handle, a first charging case disposed either above the middle display/operation panel or near the vehicle radio for more easily placing the handphone in and out of the charging case, and microphones disposed in the upper portion of the backdoor windows and/or above the back seats.

Another object of the present invention is to provide a built-in handfree and battery charging communication system for a vehicle, including a first handfree device having a microphone disposed inside the handle and a first charging case disposed either above the middle display/operation panel or near the car radio so that the handphone can be more freely placed in and out of the first charging case; a second handfree device having a second charging case disposed in the receiving box between the driver's seat and the front passenger seat; and microphones disposed in the upper portion of the backdoor windows and/or above the back seats so as to be usable with the first handfree device and/or the second handfree device.

Another object of the present invention is to provide a built-in handfree and battery charging communication system for a vehicle, including a first handfree device having a microphone on the handle and a first charging case disposed either above the display panel or near the vehicle radio for easily placing the handphone in and out of the first charging case; a second handfree device having a second charging case disposed in the receiving box between the driver's seat and the front passenger seat for easy access; a third handfree device having a third charging case disposed in an arm rest box with a cover for opening or closing the arm rest box; and microphones disposed in the upper portions of the backdoor windows and/or above the back seats to be used with the first to third handfree devices.

Another object of the present invention is to provide first through fifth handfree devices which can be selectively installed according to use and preference, and a plurality of microphones installed above the backdoor windows or the back seats for use with the selected handfree devices.

A further object of the present invention is to provide an upper plate for placing a handphone thereon, a lower plate having a control circuit, a motor for moving the upper plate towards or away from the lower plate, a gear disposed in the middle lower portion of the upper plate, a plurality of guide channels and projections for guiding the moving direction of the upper plate, a push switch for controlling the rotational direction of the motor, a first limit switch for detecting completion of the outward movement of the upper plate, a second limit switch for detecting completion of the inward movement of the upper plate, an integrated circuit IC connected through resistors to the second limit switch, and a motor control and driving circuit for controlling the rotation of the motor according to the IC and the switches.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a communication system for a vehicle having a speaker, a power source, an antenna and a phone, including at least one handfree device having a first plate built-in in a body of the vehicle, and a second plate being movable into and out of the body for charging the phone; and at least one microphone disposed inside the vehicle for use with the phone.

The present invention is further directed to a method for communicating in a vehicle having a speaker, a power source, an antenna and a phone, including the steps of providing at least one handfree device having a first plate built-in in a body of the vehicle and a second plate being movable into and out of the body for charging the phone; and disposing at least one microphone inside the vehicle for use with the phone.

The present invention is also directed to a handfree device built-in in a body of the vehicle, including a first plate fixed to the body and connected to a power source of the vehicle, and a second plate being movable in and out of the body and receiving a cordless phone thereon, wherein when the second plate is moved into the body, the second plate is positioned above the first plate and the first plate charges the cordless phone through the second plate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 5(A) and 5(B) show side views of a charging case used in the first and second handfree devices and the operational state thereof, in accordance with the embodiments of the present invention;

FIG. 7 shows a truth table and the level state of node points for explaining the operation of the circuit shown in FIG. 6.

DETAILED DESCRIPTION OF THE PREFERRED EMBODIMENTS

Referring to the appended drawings illustrating examples of the present invention, the operation and structure of a built-in handfree and battery charging communication system for a vehicle according to the embodiments of the present invention is described in detail hereinbelow.

Figure 1:
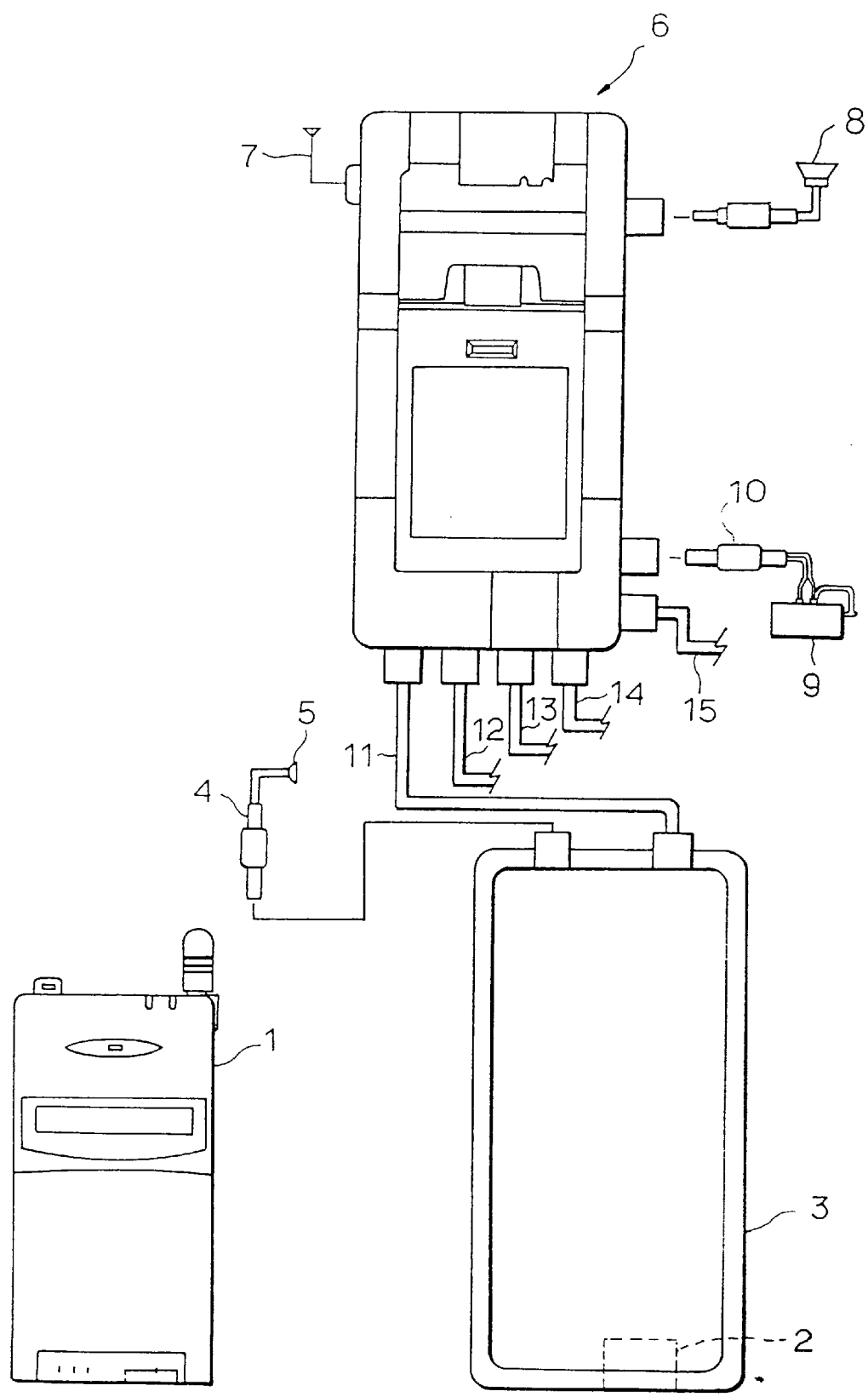
FIG. 1 shows an outline perspective view of connections of a handfree set built-in within the frame of a vehicle according to the embodiments of the present invention.

FIG. 1 shows an outline diagram of a built-in handfree set used with handfree devices for a vehicle according to the embodiments of the present invention.

As shown in FIG. 1, a cordless phone or handphone 1 is electrically connected to a charging case 3 through a connector 2. The charging case 3 includes a jack 4 disposed on one side thereof and connected to a microphone 5, and a cable 11 connected to a handfree kit 6. The handfree kit 6 includes an antenna 7 disposed on one side thereof, and a speaker 8 disposed on another side thereof. A battery 9 disposed within the vehicle functions as a power source for applying power to the handfree kit 6 through a jack 10 connected to the battery 9. This is a standard structure and connection of one handfree device for the vehicle according to the present invention.

A conventional handfree device has the charging case 3 attached above the handfree kit 6 so that the handphone 1 can be attached or detached to and from the charging case 3 more freely. The handfree kit 6 of the conventional handfree device is externally connected to the built-in components of the vehicle. Therefore, to operate the handphone 1 inside the vehicle, the user attaches the handphone 1 to the charging case 3 through the connector 2 and carries out the conversation through the microphone 5 and the speaker 8. When the handphone 1 is not in use, the electric power transmitting from the charging case 3 is used to charge the battery 9.

In the present invention, although the standard connection of the handfree kit and the charging case is similar to the conventional ones, the handfree kit 6 of the present invention is not externally disposed in the vehicle, but rather is disposed internally, i.e., within the frame of the vehicle. Furthermore, the present invention includes a plurality of cables 11, 12, 13, 14 and 15 for connecting a plurality of charging cases 3 disposed within the vehicle. Consequently, a number of microphones which can be installed and used in the vehicle can be increased.

Figure 2:
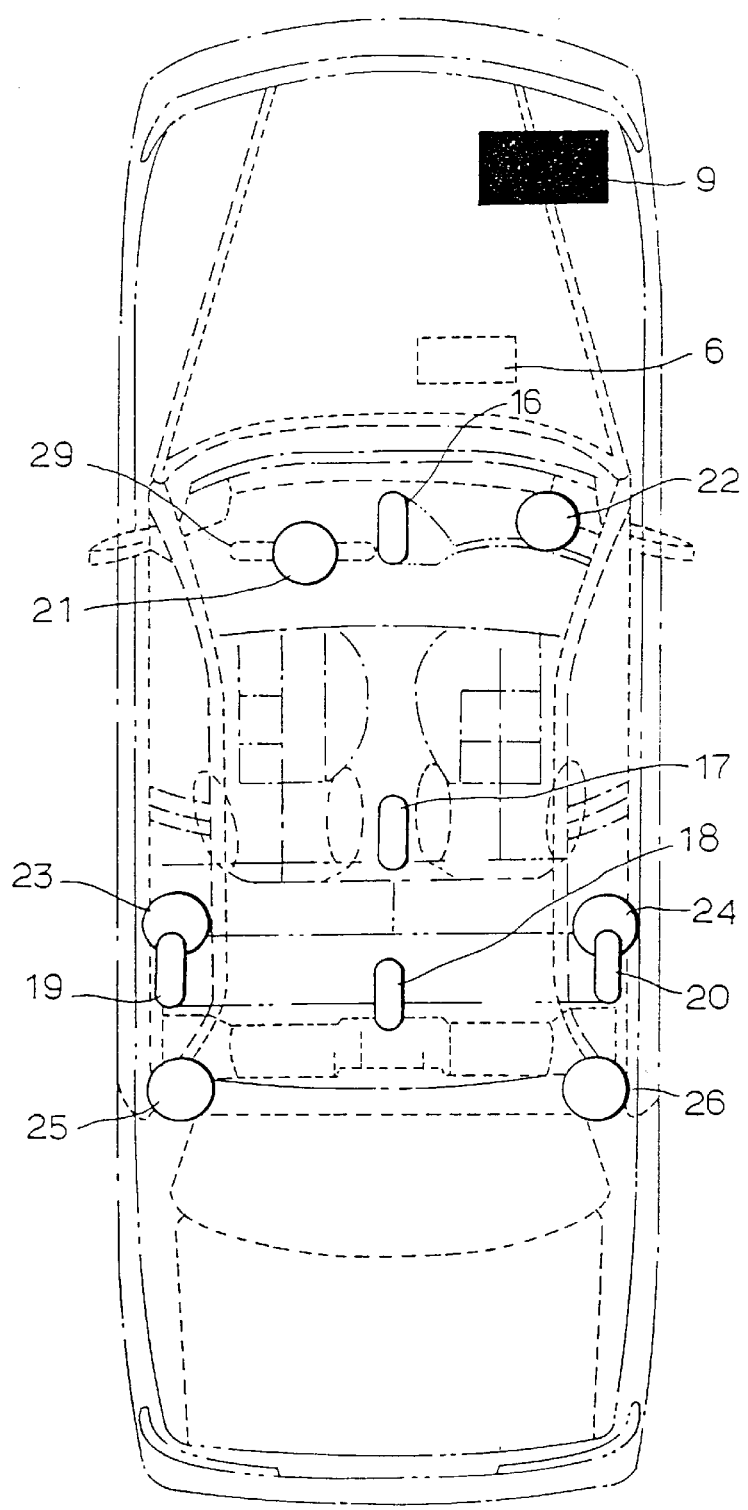
FIG. 2 shows positions of at least first through fifth handfree devices disposed within the vehicle in accordance with the embodiments of the present invention.

FIG. 2 shows at least first through fifth charging cases and a handfree kit 6 disposed within the vehicle according to the present invention. Hereinbelow, the charging case and its internal connecting devices together are referred to as a handfree device. Therefore, first to fifth handfree devices 16–20 include the first to fifth charging cases and their connections, respectively.

As shown in FIG. 2, the first handfree device 16 is installed in a control box disposed between the driver's seat and the front passenger seat. For use with the first handfree device 16, a microphone 21 is installed on the handle 29 and a microphone 22 is installed on a receiving box of the vehicle, e.g., a glove compartment.

The second handfree device 17 is disposed in the receiving box between the driver's seat and the front passenger seat. That is, although both the first and second handfree devices 16 and 17 are installed in the front part of the vehicle, the second handfree device 17 is positioned more for the back seat passengers.

In the back seat area of the vehicle, the third, fourth and fifth handfree devices 18, 19 and 20 are installed within the built-in components of the vehicle. The third handfree device 18 is installed in the arm rest box between the back seats, whereas the fourth and fifth handfree devices 19 and 20 are disposed in the left and right side backdoor trims, respectively. For use with the third to fifth handfree devices 18, 19 and 20, microphones 23 and 24 are disposed above the back side windows, and microphones 25 and 26 are disposed on the walls between the back window and the back doors.

Each of the first through fifth handfree devices 16, 17, 18, 19 and 20 can use the vehicle speakers as its speaker. In which case, small speakers can be provided adjacent the vehicle speakers. It is not necessary to always use four speakers of the vehicle. One of the four speakers can be used for all the handfree devices because the interior of the vehicle is usually not too large. Furthermore, in the present communication system the user can select a preferred number of handfree devices to use based on preference or need. Moreover, according to the user selection, more microphones can be installed at the backdoor window sides and above and below the back seats to enhance performance of the handfree devices.

For example, one example of the built-in handfree and battery charging communication system of the present invention includes a microphone disposed on the handle, a first charging case disposed either above the middle display/operation panel or near the vehicle radio for more easily placing the handphone in and out of the charging case, and microphones disposed in the upper portion of the backdoor windows and/or above the back seats.

Another example of the built-in handfree and battery charging communication system of the present invention includes a first handfree device having a microphone disposed on the handle and a first charging case disposed either above the middle display/operation panel or near the car radio so that the handphone can be more freely placed in and out of the first charging case; a second handfree device having a second charging case disposed in the receiving box between the driver's seat and the front passenger seat; and microphones disposed in the upper portion of the backdoor windows and/or above the back seats so as to be usable with the first handfree device and/or the second handfree device.

Another example of the built-in handfree and battery charging communication system according to the present invention includes a first handfree device having a microphone on the handle and a first charging case disposed either above the operation control/display panel or near the vehicle radio for easily placing the handphone in and out of the first charging case; a second handfree device having a second charging case disposed in the receiving box between the driver's seat and the front passenger seat for easy access; a third handfree device having a third charging case disposed in an arm rest box with a cover for opening or closing the arm rest box; and microphones disposed in the upper portions of the backdoor windows and/or above the back seats to be used with the first to third handfree devices.

In these examples, the user can select to use one or more of the first to third handfree devices. For example, instead of using the first handfree device, it is possible to selectively operate the second and third handfree devices. Similarly, without using the first or second handfree device, the user can selectively operate the third handfree device or any additional handfree devices installed within the vehicle.

Figure 3A:
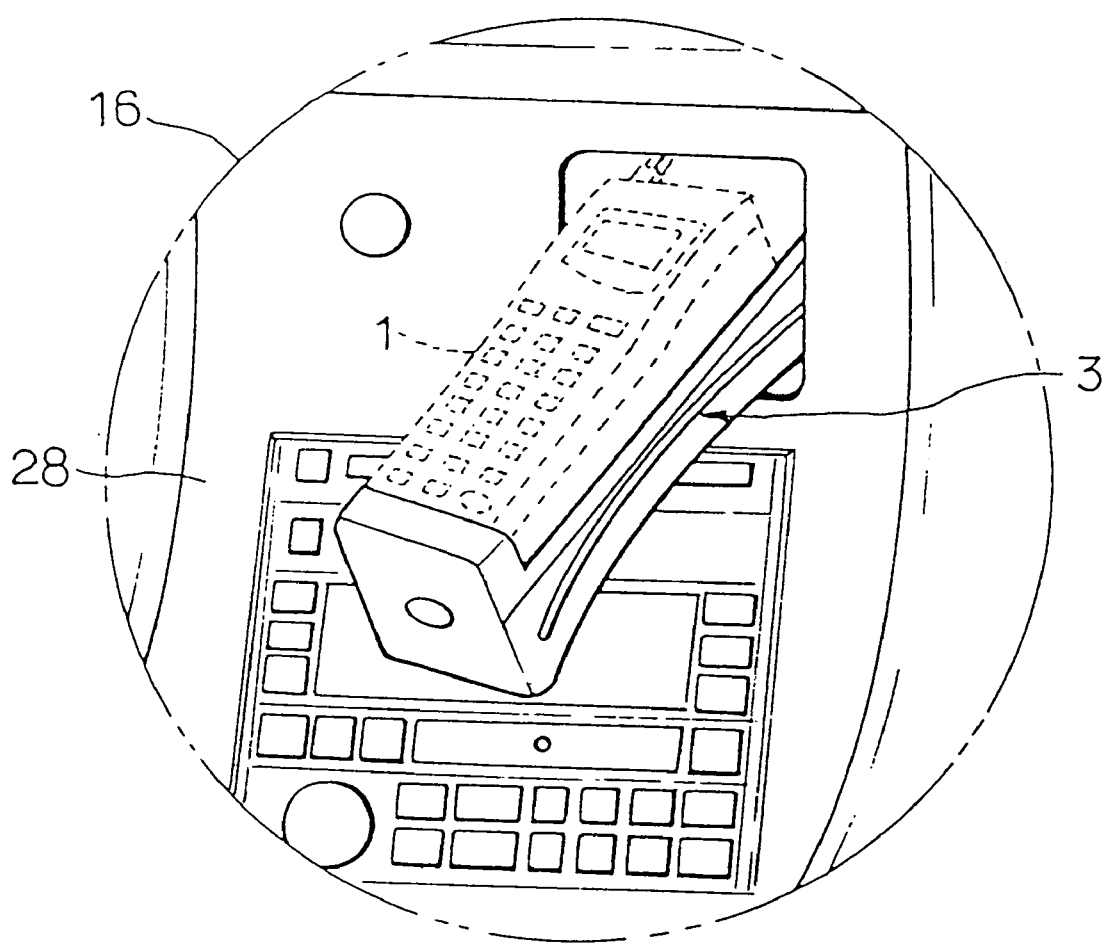
FIG. 3(A) shows an enlarged partial perspective view of the first handfree device shown in FIG. 2.

As shown in FIG. 3(A), the first handfree device 16 includes the first charging case 3 disposed inside the display panel 28 near the driver's seat. This provides concurrent operation of the display panel 28 and the handphone 1.

Figure 3B:
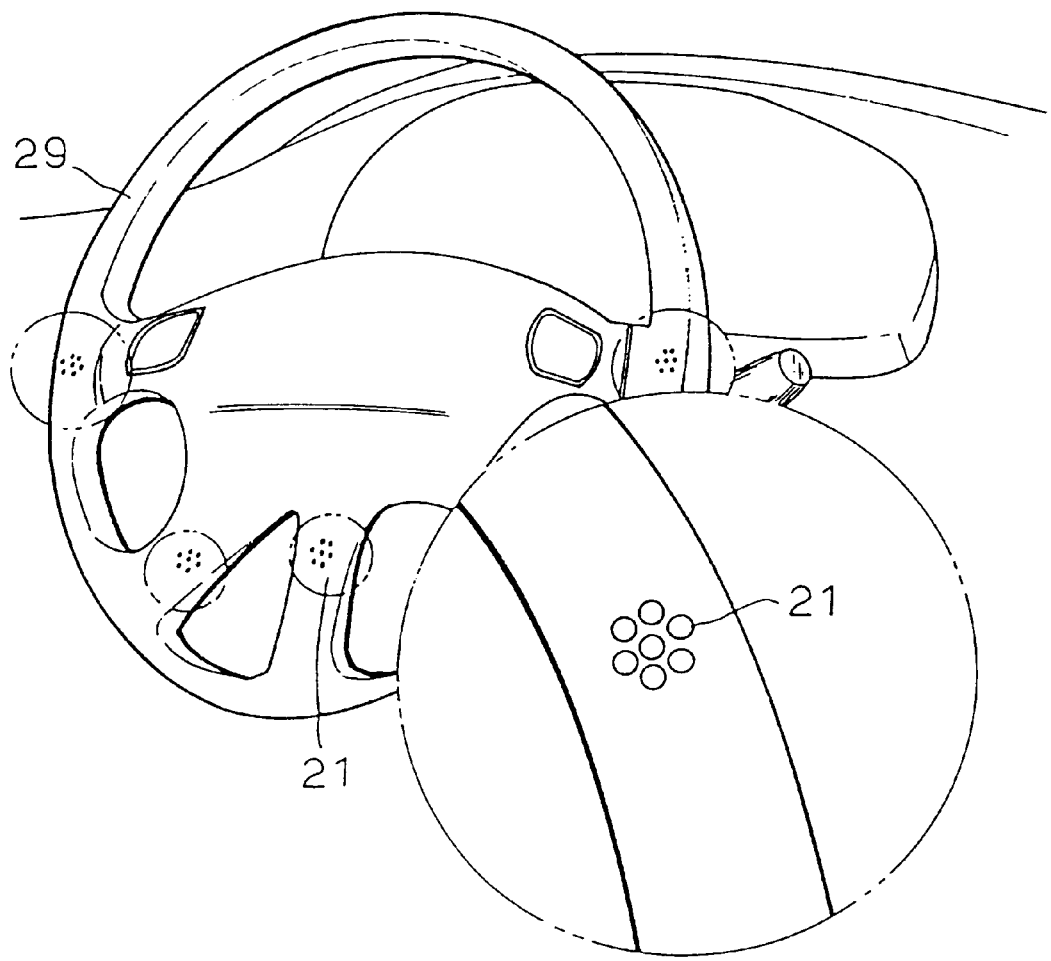
FIG. 3(B) shows a perspective and enlarged view of a microphone useable with the first handfree device shown in FIG. 2.

As shown in FIG. 3(B), one or more microphones 21 are disposed on the handle 29. The microphone 21 can be disposed on any portion of the handle 29.

In operating the first handfree device 16 as shown in FIG. 3(A), the handphone 1 is easily inserted into the charging case 3 for being charged by the case 3 through the connector of the charging case 3. In order to retrieve the charging case 3 from the display panel 28, a first push button/switch is provided on the display panel 28. When the user activates the first switch, a motor is rotated to move the charging case 3 out of the display panel 28. In order to retract the charging case 3 into the display panel 28, the charging case 3 is gently pushed in. This causes the motor to rotate in reverse direction and the charging case 3 is moved into the display panel 28.

Figure 3C:
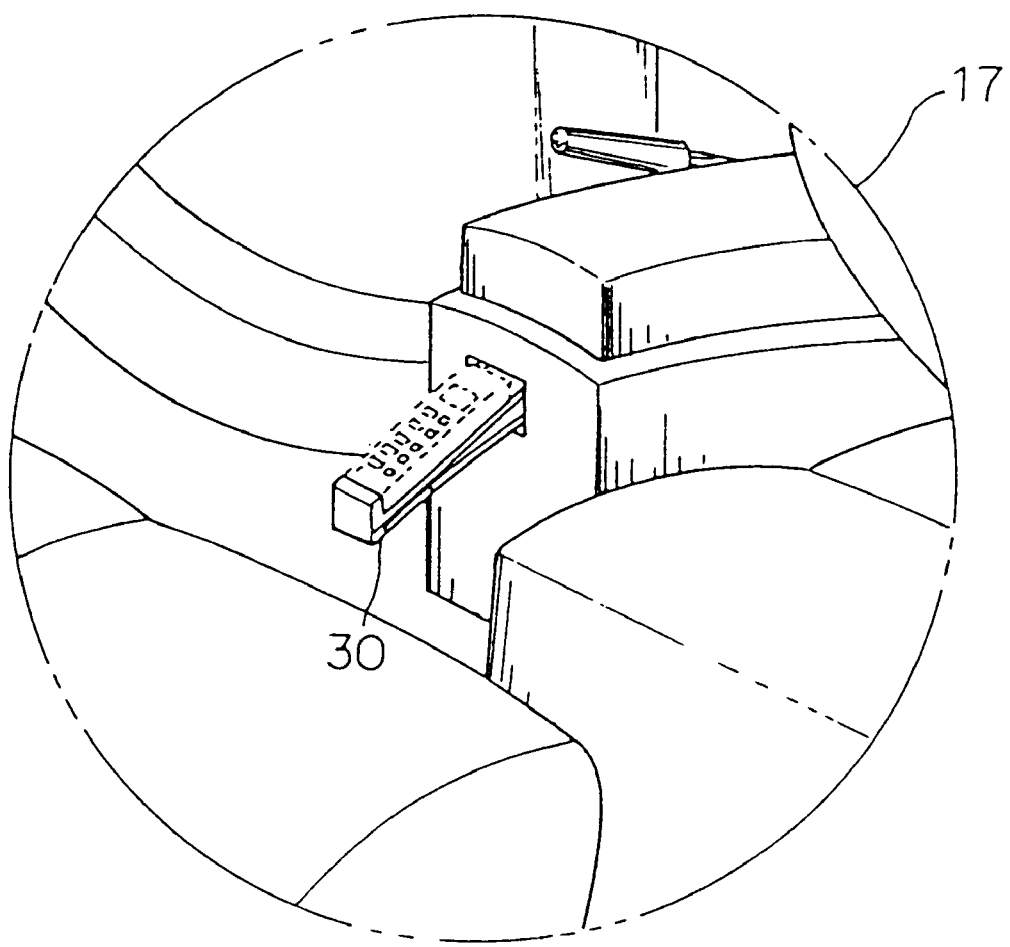
FIG. 3(C) shows a partial perspective view of the second handfree device shown in FIG. 2.

As shown in FIG. 3(C), the second handfree device 17 includes a second charging case 30 disposed in the receiving box between the driver's seat and the front passenger seat. The second charging case 30 has the same structure and operates in the same manner as the first charging case 3.

Figure 4A:
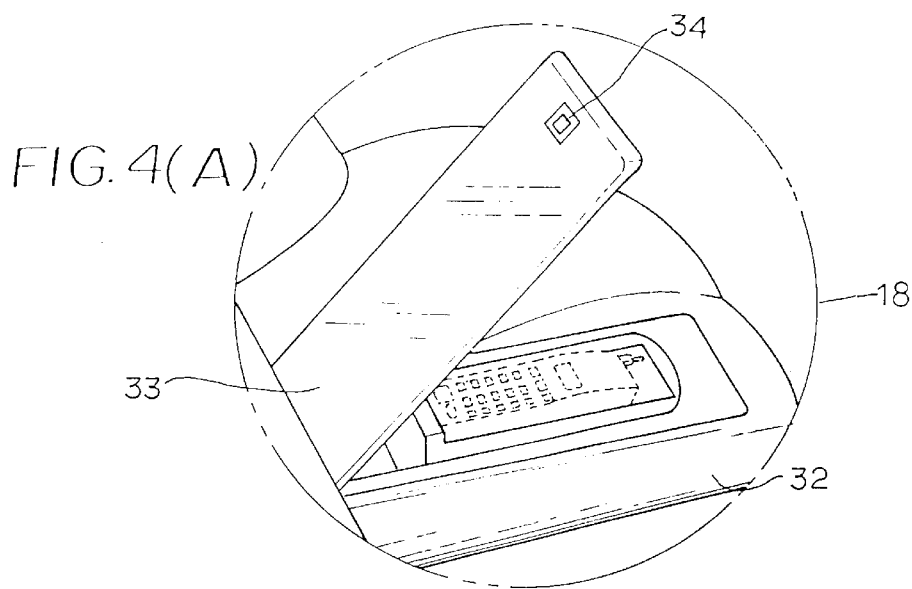
FIG. 4(A) shows a partial perspective view of the third handfree device shown in FIG. 2.

As shown in FIG. 4(A), the third handfree device 18 does not include a separate microphone and is disposed in the arm rest box 32. The third handfree device 18 includes a charging case, e.g., the case 3, connected to one of the cables 11–15 of the handfree kit 6. On the charging case disposed inside the armrest box 32, a cordless phone is placed. The arm rest box 32 is usually located between the seats, and has a cover 33 and a locking member 34 for securing the phone therein. The arm rest box 32 has a standard arm rest box structure, which includes a receiving box and a folding cover for opening and closing the receiving box.

Figure 4B:
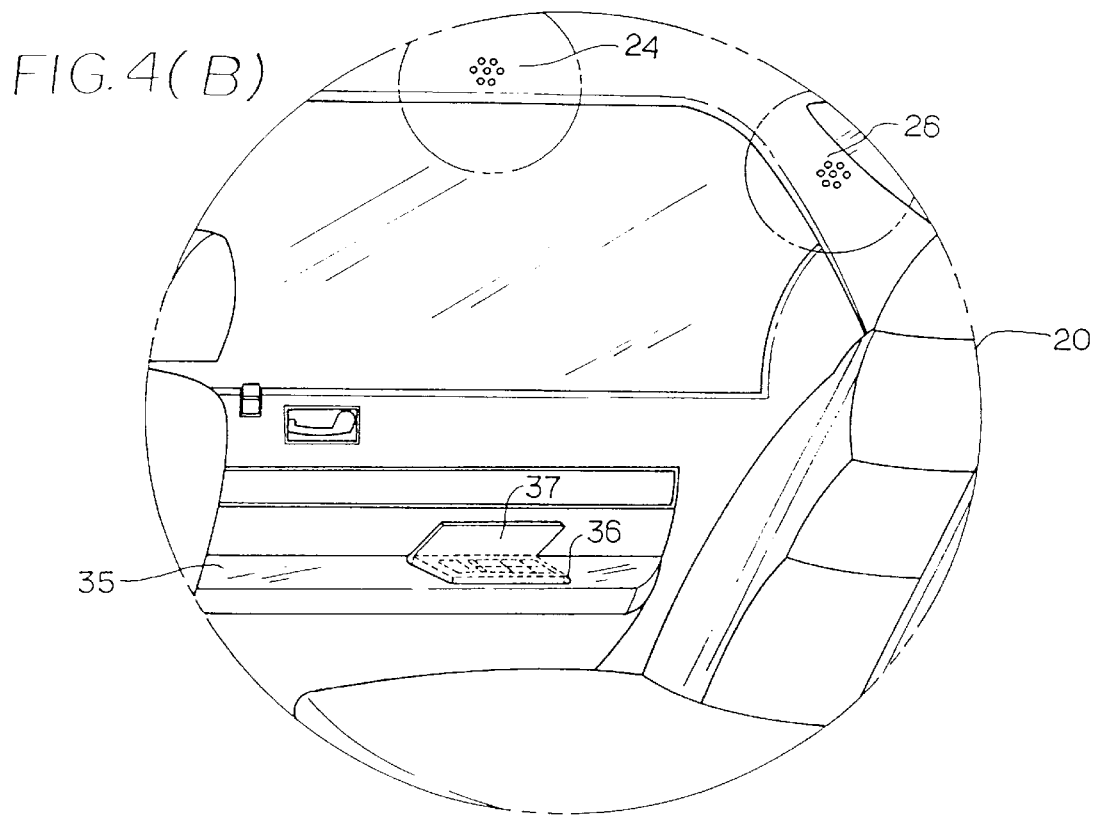
FIG. 4(B) shows a partial perspective view of the fourth and fifth handfree devices shown in FIG. 2.

The fourth and fifth handfree devices 19 and 20 have the same structure as the third handfree device 18. Each of the fourth and fifth handfree devices 19 and 20 includes a charging case connected to the handfree kit 6 for charging the phone placed thereon. The charging cases of the fourth and fifth handfree devices 19 and 20 are each disposed in a door trim 35 of either the left or right side backdoor as shown in FIG. 4(B). The raised portion of the door trim 35 includes a receiving groove 36 for receiving either the fourth or fifth handfree device 19 or 20, and a cover 37 for covering the handfree device inside the receiving groove 36. The raised portion of the door trim 35 is usually used to provide switches for operating windows, etc.

For use with the fourth and fifth handfree devices 19 and 20, the microphone 24 is disposed above the backdoor windows and/or the microphone 26 is disposed in the corner of the back seat, as shown in FIG. 4(B). That is, although the first through fifth handfree devices use one common speaker, a plurality of microphones are disposed in the areas where people's voices can be best heard. For example, for the second and third handfree devices 17 and 18, microphones are disposed above the backdoor window or on the wall between the backdoor and the back window, so that the back passengers can use the communication system. As described above, tn the present communication system, microphones are selectively disposed according to the preferred use and need of the users.

The fourth and fifth handfree devices 19 and 20 are disposed in the raised portion of the door trim 35 with the cover 37 so that the handphones can be easily inserted in and taken out of the receiving groove 36. However, the first and second handfree devices 16 and 17 each include a structure for installing and moving a charging case.

FIGS. 5(A) and (B) show examples of operational state of the handfree device for explaining the operation of the charging case connectable to the handfree device according to the present invention.

As shown in FIGS. 5(A) and (B), the first and second handfree devices 16 and 17 each include a lower plate 46 fixed to a body member 51 of the vehicle, and an upper plate 50 capable of rotatably sliding to and from the lower plate 46. On both sides of the lower plate 46, a guide channel/groove 47 is formed, whereas on both sides of the upper plate 50 a guide projection 42 movable along the corresponding guide channel 47 is formed. The guide projection 42 includes at its one end a raised portion having a projection 52 extending therefrom for turning on/off a limit switch LS1.

The lower plate 46 assembled with the upper plate 50 define a circular configuration, e.g., an arc, so as to permit in- and out-rotational movements of the upper plate 50. It should be noted that, in order for the users in the vehicle to comfortably operate the handphone, an arc having a center angle within the 30° range is preferable.

Figure 5B:
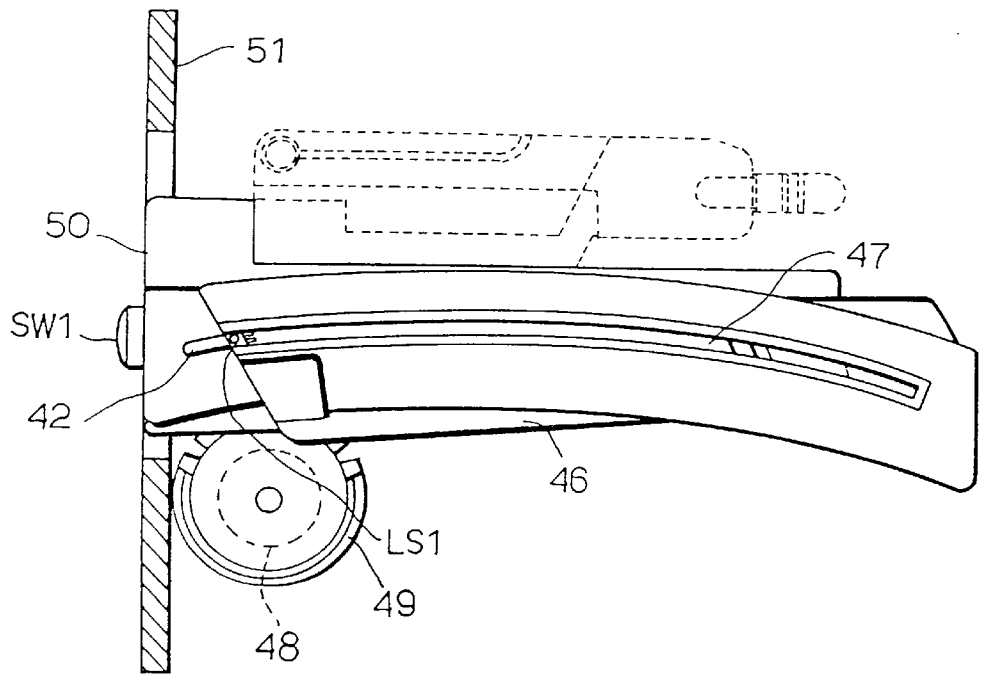
Figure 5C:
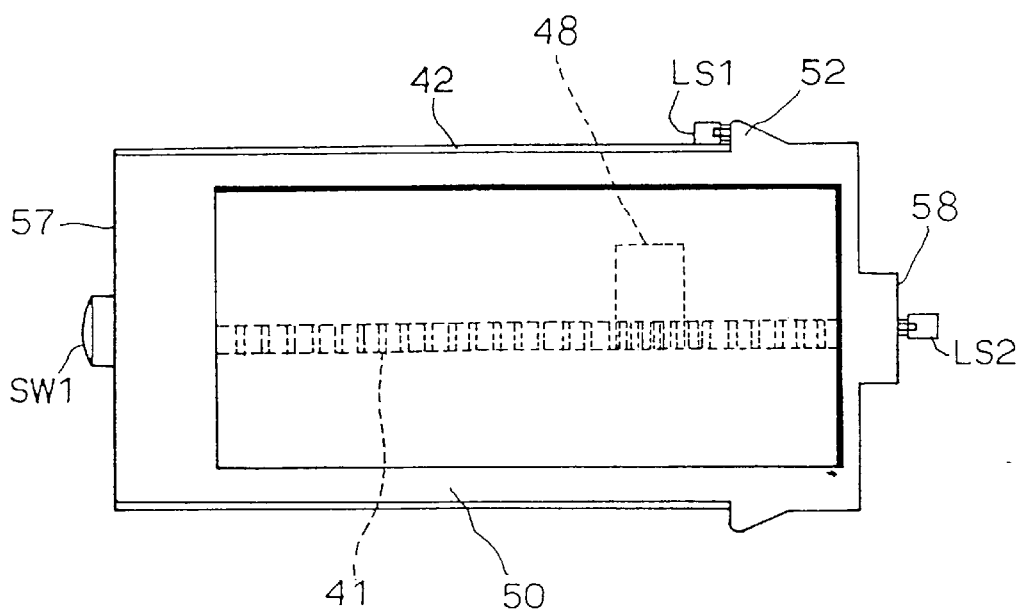
FIG. 5(C) shows a selective view of the structure of top and bottom plates of the charging case for the fifth handfree device in accordance with the embodiments of the present invention.

Furthermore, as shown in FIG. 5(C) a gear 41 is formed along the middle lower portion of the upper plate 50. The gear 41 is in gearing relationship with a teethed wheel 49 fixed to a motor 48. The teethed wheel 49 is disposed under the lower portion of the lower plate 46 so that it is placed in gearing relationship with the gear 4. Then, using the forward and rearward rotation of the motor 48, the upper plate 50 moves towards or away from the lower plate 46. FIG. 5(C) shows, in the dotted line, the gear 41 in gearing relationship with the teethed wheel 49. In the lower plate 46, a charging circuit for charging the electric power source of the handphone is disposed.

Although the drawings show that the motor 48 activates the gear 41 to be in gearing relationship with the teethed wheel 49, it is possible to use other means, for example, a damper and a spring, to achieve the same operation.

The handfree device includes two limit switches and one push button switch for controlling the movement of the handphone and charging case. As shown in FIG. 5(C), a push button SW1 is formed at the end portion of the upper plate 50. Limit switches LS1, LS2 are installed to verify the position of the upper plate 50. The limit switch LS1 checks the position of the upper plate 50 when it is being projected out of the body member 51 away from the lower plate 46, whereas the limit switch LS2 checks the position of the upper plate 50 when it is being retracted toward the lower plate 46. The limit switch LS1 is formed in one end portion of either one of the guide channels 47 of the lower plate 46. The limit switch LS2 is formed in an opposite end portion of the lower plate 46. The limit switch LS1 is located closer to the body member 51 than the limit switch LS2, as shown in FIG. 5(A).

When the upper plate 50 moves away from the lower plate 46, the limit switch LS1 is contacted by the projection 52 of the upper plate 50 upon completion of the outward movement. When the upper plate 50 moves toward the lower plate 46, the limit switch LS2 is contacted by a projection 48 of the upper plate 50 upon completion of the inward movement.

The operation of the first and second handfree devices 16 and 17 is as follows.

First, the switch SW1 disposed on the front portion of the charging case 3 is pushed to cause the motor 48 to rotate. As the motor 48 rotates, the teethed wheel 49 fixed to the side of the motor 48 rotates in gearing relationship with the gear 41 disposed on the upper plate 50, causing the upper plate 50 to project outwardly from the body member 51, as shown in FIG. 5(B).

That is, as the motor 48 rotates, the upper plate 50 which is assembled with the lower plate 46 is guided through the guide groove 47 of the lower plate 46 and moves away from the lower plate 46. When the upper plate 50 is completely out, the limit switch LS1 formed at one end portion of the guide groove 47 of the lower plate 46 contacts the projection 52 of the upper plate 50 and cuts off the power supply to the motor 48.

Accordingly, the upper plate 50 projects out of the body member 51 (e.g., the display panel 28) with a constant rotational angle. This positions the handphone in an angle, which makes it easier to operate the buttons of the handphone. Then the user may operate the handphone to communicate with others according to the standard operation of the handfree device.

After completing the telephone conversation, the user pushes in the upper plate 50 slightly to insert the upper plate 50 into the body member 51. The slight push opens up the limit switch LS1 disposed on the lower plate 46 and causes the motor 48 to rotate in a reverse direction. Then, the gear 41 in gearing relationship with the teethed wheel 49 is reversely operated so that the upper plate 50 is guided through the guide the guide groove 47 of the lower plate 46 toward the lower plate 46. When the projection 58 of the upper plate 50 contacts the limit switch LS2 upon the completion of the inward movement, the rotation of the motor 48 is stopped and the upper plate 50 is completely assembled above the lower plate 46.

Accordingly, the motor's forward and reverse rotation (clockwise or counter-clockwise rotation) controls whether the upper plate 50 moves towards or away from the lower plate 46. As constructed, the upper plate 50 and the lower plate 46 form a predetermined circular configuration (e.g., an arc) such that the upper plate 50 moves towards or away from the lower plate 46 in an arc direction. Consequently, the handphone 1 disposed on the upper plate 50 can be placed in a position which is most convenient and comfortable for the user to operate.

Figure 6:
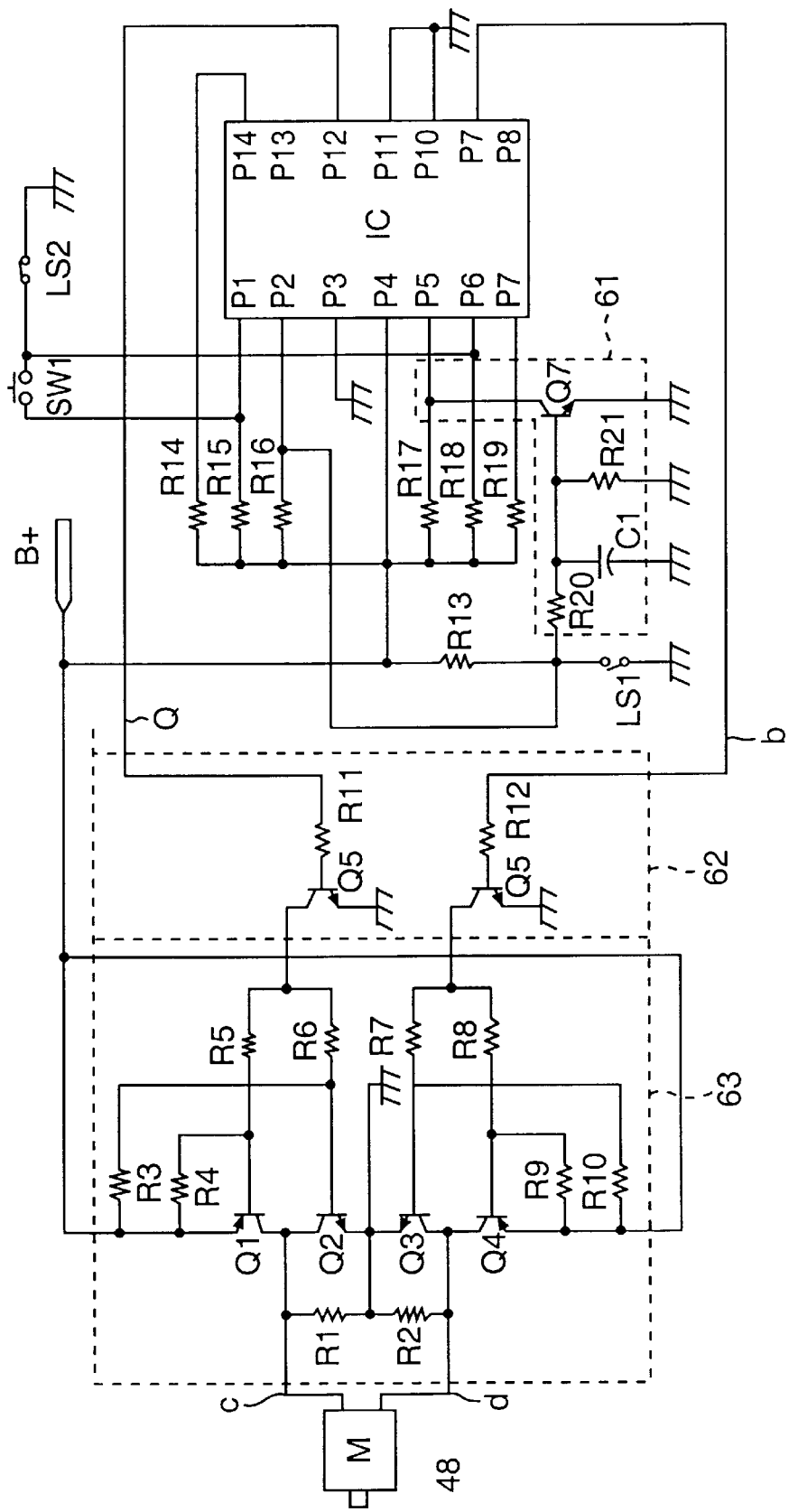
FIG. 6 shows a circuit diagram for controlling the operation of the first and second handfree devices in accordance with the embodiments of the present invention.

FIG. 6 shows a control circuit diagram for operating the first and second handfree devices according to the embodiments of the present invention. The rotation control of the motor 48 is as follows.

The IC (integrated circuit) operating in accordance with the first switch SW1 and limit switches LS1, LS2 is provided with two flip flop circuits.

The operation of IC is described hereinbelow referring to FIGS. 6 and 7.

The first push switch SW1 for controlling the rotational direction of the motor 48, the limit switch LS1 for verifying the outward movement of the upper plate 50, and the limit switch LS2 for verifying the inward movement of the upper plate 50 are connected to the integrated circuit IC through resistor R14–R19. The limit switch LS1 is connected to a clock controller 61 having resistors R20, R21, a condenser C1, and a transistor Q7 connected thereto.

Ports P9 and P12 of the integrated circuit IC are electrically connected to the base of transistors Q6, Q5, respectively, which form a motor direction controller 62 for controlling a motor driving circuit 63. The motor driving circuit 63 includes resistors R1–R10 and transistors Q1–Q4 for controlling flow of electricity being transmitted to the motor 48.

When the upper plate 50 is completely positioned above the lower plate 46, the limit switch LS2 is in the closed state as being grounded, and the first switch SW1 and limit switch LS1 are maintained in the opened state to maintain port P9 and P12 of the integrated circuit IC in the lower level state. Accordingly, the node points a and b as shown in FIG. 6 have a low signal level, which maintains the transistors Q5 and Q6 for determining the motor rotation direction in the turn-off state. Accordingly, rotation of the motor 48 is prevented.

At this state, when the first switch SW1 is activated, the falling edge of a pulse signal is input to the port P1, which causes a high level signal to be output from the port P12. Then the port P9 maintains its lower level state so that the high level signal at node a turns on the transistor Q5. When the transistor Q5 is turned on, the transistor Q2 is turned off, the transistor Q1 is turned on, and a voltage B+ is input to the motor 48 through the transistor Q1. Then, the motor 48 is rotated causing the upper plate 50 to move away from the lower plate 46. Even when the pushing of the push switch SW1 is released, a pulse having a rising edge is generated and input to the port P1. This maintains the port P9 at its low level state and the port P12 outputs a high level signal, causing the motor 48 to continuously rotate in the same direction.

Thereafter, as shown in FIG. 5(A), when the upper plate 50 is completely projected out from the body member 51, the upper plate's projection 52 contacts the limit switch LS1. This causes a pulse having a falling edge to be input to the port P2 and turns off the transistor Q7. As a result, the voltage signal B+ is input to the port P5 through the resistor R17, and a rising edge pulse is input to the port P5.

Accordingly, the output port P12 of the integrated circuit IC outputs a low level signal to the motor 48 so as to stop rotation of the motor 48 and to maintain the upper plate 50 out of the body member 51 for externally positioning the handphone to the users.

If the user slightly pushes in the projected upper plate 50, the limit switch LS1, which was closed due to the projection 52 of the upper plate 50 contacting the switch LS1, is now opened and thus a rising edge pulse is input the port P2 of the integrated circuit IC. Then the voltage signal B+ is applied to the transistor Q7 for turning it on. This causes a falling edge pulse to be input to the port P5. Then the port P9 outputs a high level signal and the port P12 is maintained in its lower level state.

Accordingly, the transistor Q5 is maintained in its turned-off state, the transistor Q6 is maintained in its turned-on state, and the voltage signal B+ is applied to the motor 48 through the transistor Q4, whereby the motor 48 is rotated in the reverse or counter-clockwise direction.

As the motor 48 rotates in the reverse direction, the upper plate 50 moves towards the lower plate 46. Upon the completion of this inward movement, the projection 58 of the upper plate 50 contacts the limit switch LS2 and grounds it. Then, a falling edge pulse is directly input to the port P6 of the integrated circuit IC, and the output port P9 outputs a lower level signal, which turns off the transistors Q5 and Q6. As a result, rotation of the motor 48 is stopped.

Each of the first and second handfree devices 16 and 17 of the present invention includes the upper plate 50 and the lower plate 46 having a charging circuit therein for charging the handphone. The upper plate 50 is rotatably movable in and out of the lower plate 46 by merely using a touch. Thus, while driving, the driver can easily and freely operate the handphone disposed on the upper plate 50 being externally disposed to the user. The driver can also easily push in the upper plate 50 by using a slight touch to internally dispose the upper plate 50 within the frame of the vechile.

Furthermore, the present invention is advantageous because it provides microphones on a handle for the driver to conveniently communicate in his or her driving position. The front seat passenger can also communicate through a separate microphone disposed nearby.

Moreover, the third to fifth handfree devices of the present invention each include a receiving groove for receiving the handphone therein and a cover for covering the receiving groove, such that anyone inside the vehicle can have easy access to the phone and can operate the phone through microphones selectively disposed near the handfree devices.

Accordingly, the built-in handfree and battery charging communication system for a vehicle in accordance with the present invention includes handfree devices which are not separately attached to the vehicle. The present handfree devices are either retractable into the body of the vehicle or safely disposed in a box under a cover. This limits handfree devices from hitting the people or other objects in the vehicle, especially in accidents. Furthermore, the present invention offers improved outward appearance of the interior of the vehicle, increased internal space for the vehicle, and a minimum exposure to electrical wires/connections for the handfree devices. For a handphone usable with the handfree devices of the present invention, standard wireless analog and/or digital handphones, e.g., PCS, PHS, PDA, GSM, CT-2 can be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication system for a vehicle having a speaker, a power source, an antenna and a phone, comprising:

at least one handfree device having a first plate built-in in a body of a vehicle, and a second plate being movable into and out of the body for charging the phone; and at least one microphone disposed inside the vehicle for use with the phone, wherein the first plate includes a gear portion formed in a lower portion of the first plate, and a pair of guide grooves formed on opposite sides of the first plate.

2. The system of claim 1, further comprising:

a handfree kit built-in in the vehicle and being connected to the speaker, the power source, the antenna, and the first plate of the one handfree device.

3. The system of claim 1, further comprising:

a motor connected to the power source, and a wheel surrounding the motor and being in gearing relationship with the gear portion of the first plate as the motor rotates.

4. The system of claim 1, wherein the second plate includes:

a pair of guide projections formed on two opposite sides of the second plate and being movable in the guide grooves of the first plate.

5. The system of claim 1, wherein the second plate includes:

a first projection formed on an end portion of the second plate, and a second projection formed on a back portion of the second plate.

6. The system of claim 5, further comprising:

a first switch for moving the second plate out of the body, a second switch for cooperating with the first projection, and a third switch for cooperating with the second projection.

7. The system of claim 6, wherein the second switch detects whether the second plate is moved completely out of the body, and the third switch detects whether the second plate is moved completely into the body.

8. The system of claim 6, further comprising:

a control circuit controlling movement of the second plate of the one handfree device into and out of the body according to the first, second and third switches.

9. The system of claim 8, wherein the control circuit includes:

an integrated circuit for receiving outputs of the first, second and third switches, a plurality of transistors, resistors and capacitors connected to the integrated circuit, and a motor control circuit connected to the integrated circuit and controlling a rotational direction of the motor.

10. The system of claim 1, wherein when the second plate is moved out of the body, the first and second plates are connected in an arc configuration so that the phone is placed on the second plate at a predetermined angle.

11. The system of claim 1, wherein once the second plate is moved out of the body, the second plate is moved into the body by slightly pushing in the second plate.

12. The system of claim 1, wherein the at least one handfree device includes a plurality of the handfree devices having first and second handfree devices, the first handfree device being disposed within a display panel of the vehicle, and the second handfree device being disposed in a box located between a driver's seat and a front passenger seat of the vehicle.

13. The system of claim 12, further comprising:
a third handfree device disposed in an arm rest box located between back passenger seats of the vehicle, the third handfree device having a charging case built-in in the arm rest box, the charging case being connected to the power source of the vehicle.

14. The system of claim 13, further comprising:
fourth and fifth handfree devices each disposed in a door trim portion of a back door of the vehicle, each of the fourth and fifth handfree devices having a charging case built-in in the door trim portion and connected to the power source of the vehicle.

15. The system of claim 14, wherein the door trim portion includes a groove and a cover for securely placing one of the fourth and fifth handfree devices therein.

16. The system of claim 1, wherein the at least one microphone includes at least one of the following:
a first microphone disposed on a handle of the vehicle,
a second microphone disposed in front of a front passenger's seat in the vehicle,
a third microphone disposed above a right backdoor window of the vehicle,
a fourth microphone disposed on a right corner wall located between the right backdoor window and a right back seat of the vehicle,
a fifth microphone disposed above a left backdoor window of the vehicle, and
a six microphone disposed on a left corner wall located between the left backdoor window and a left back seat of the vehicle.

17. A method for communicating in a vehicle having a speaker, a power source, an antenna and a phone, comprising the steps of:
providing at least one handfree device having a first plate built-in a body of the vehicle and a second plate being movable into and out of the body for charging the phone; and
disposing at least one microphone inside the vehicle for use with the phone, wherein the step of providing at least one handfree device includes the steps of,
forming a gear portion in a lower portion of the first plate, and
forming a pair of guide grooves on opposite sides of the first plate.

18. The method of claim 17, further comprising:
providing a handfree kit built-in in the vehicle, and
connecting the handfree kit with the speaker, the power source, the antenna, and the first plate of the one handfree device.

19. The method of claim 17, further comprising the steps of:
providing a motor connected to the power source, and
providing a wheel surrounding the motor and being in gearing relationship with the gear portion of the first plate as the motor rotates.

20. The method of claim 17, wherein the step of providing at least one handfree device further includes the steps of:
forming a pair of guide projections on two opposite sides of the second plate, and
moving the guide projections in the guide grooves of the first plate.

21. The method of claim 17, wherein the step of providing at least one handfree device includes the steps of:
forming a first projection on an end portion of the second plate, and
forming a second projection on a back portion of the second plate.

22. The method of claim 21, further comprising the steps of:
providing a first switch for moving the second plate out of the body,
providing a second switch for cooperating with the first projection, and
providing a third switch for cooperating with the second projection.

23. The method of claim 22, wherein the second switch detects whether the second plate is moved completely out of the body, and the third switch detects whether the second plate is moved completely into the body.

24. The method of claim 22, further comprising the step of:
controlling movement of the second plate into and out of the body according to the first, second and third switches.

25. The method of claim 17, wherein when the second plate is moved out of the body, the first and second plates are connected in an arc configuration so that the phone is placed on the second plate at a predetermined angle.

26. The method of claim 17, further comprising the step of:
slightly pushing in the second plate to automatically move the second plate into the body, once the second plate is moved out of the body.

27. The method of claim 17, wherein the step of providing at least one handfree device includes the steps of:
providing a plurality of the handfree devices including first and second handfree devices,
disposing the first handfree device within a display panel of the vehicle, and
disposing the second handfree device in a box located between a driver's seat and a front passenger seat of the vehicle.

28. The method of claim 27, further comprising the step of:
disposing a third handfree device in an arm rest box located between back passenger seats of the vehicle, the third handfree device having a charging case built-in in the arm rest box, the charging case being connected to the power source of the vehicle.

29. The method of claim 28, further comprising the step of:
disposing each of fourth and fifth handfree devices in a door trim portion of a back door of the vehicle, the fourth and fifth handfree devices each having a charging case built-in in the door trim portion and connected to the power source of the vehicle.

30. The method of claim 29, wherein the step of disposing each of fourth and fifth handfree devices includes the step of:
forming a groove and a cover on the door trim portion for securely placing one of the fourth and fifth handfree devices therein.

31. The method of claim 17, wherein the step of providing at least one microphone includes at least one of the following steps:

providing a first microphone on a handle of the vehicle, providing a second microphone in front of a front passenger's seat in the vehicle, providing a third microphone above a right backdoor window of the vehicle, providing a fourth microphone on a right corner wall located between the right backdoor window and a right back seat of the vehicle, providing a fifth microphone above a left backdoor window of the vehicle, and providing a six microphone on a left corner wall located between the left backdoor window and a left back seat of the vehicle.

32. A handfree device built-in in a body of the vehicle, comprising:

a first plate fixed to the body and connected to a power source of the vehicle; and a second plate being movable in and out of the body and receiving a phone thereon, wherein when the second plate is moved into the body, the second plate is positioned above the first plate and the first plate charges the phone through the second plate, the first plate including, a gear portion formed in a lower portion of the first plate, and a pair of guide grooves formed on opposite sides of the first plate.

33. The device of claim 32, wherein the second plate includes:

a pair of guide projections formed on two opposite sides of the second plate, wherein the guide projections move in the guide grooves of the first plate.

34. The device of claim 33, further comprising:

a motor being connected to the power source and rotatable in two directions; and a wheel surrounding the motor and being in gearing relationship with the gear portion of the first plate as the motor rotates.

35. The device of claim 32, wherein the second plate includes:

a first projection formed on an end portion of the second plate, and a second projection formed on a back portion of the second plate.

36. The device of claim 35, further comprising:

a first switch for moving the second plate out of the body;

a second switch for cooperating with the first projection; and a third switch for cooperating with the second projection.

37. The device of claim 36, further comprising:

a control circuit controlling movement of the second plate in and out of the body according to the first, second and third switches.

38. The device of claim 37, wherein the control circuit includes:

an integrated circuit for receiving outputs of the first, second and third switches, a plurality of transistors, resistors and capacitors connected to the integrated circuit, and a motor control circuit connected to the integrated circuit and controlling a rotational direction of the motor.

39. The device of claim 32, wherein when the second plate is moved out of the body, the first and second plates are connected in an arc configuration so that the phone is placed on the second plate in a predetermined angle.

\* \* \* \* \*